Patented Feb. 25, 1936

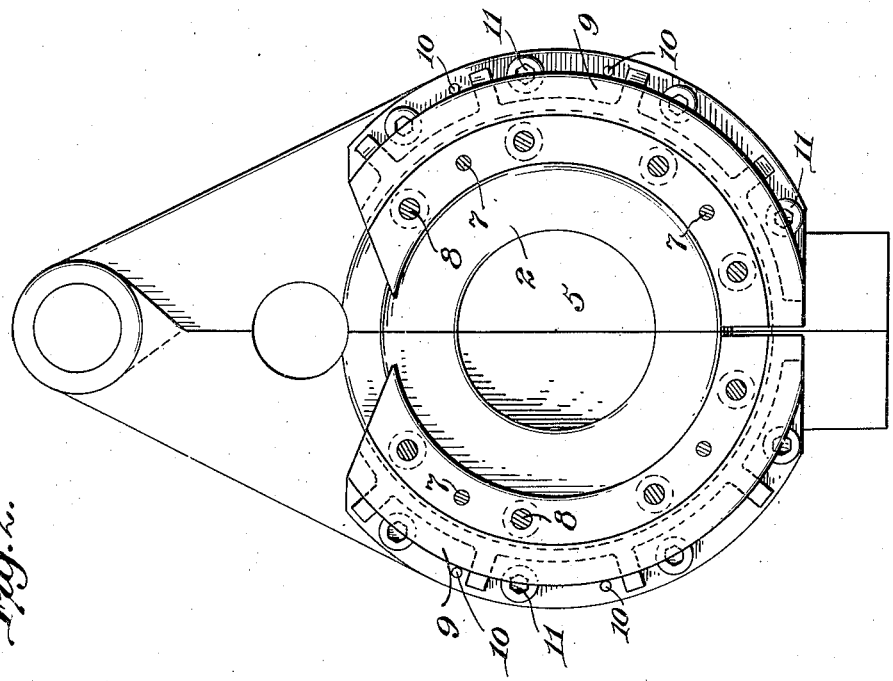

2,031,739

UNITED STATES PATENT OFFICE 2,031,739

MOLD ALIGNING APPARATUS

Hosea Shaffer, Washington, Pa., assignor to Hazel-Atlas Glass Company, Wheeling, W. Va., a corporation of West Virginia Application November 26, 1934, Serial No. 754,866

3 Claims. (Cl. 49—69)

In the manufacture of glass containers there must be a fine alignment between the neck rings and blow molds of the glass forming machines, for otherwise the necks of the containers will be off center with respect to the bodies thereof. This often results in the loss of considerable ware. One of the objects of the present invention is to provide a device which will always insure an exact alignment between the blow molds and the neck rings.

Another object of the invention is to provide a device of this character which is particularly adapted to those types of machines in which the blow molds do not embrace the neck ring when closed, and which is simple in construction and inexpensive in manufacture.

Other objects and advantages of the invention will be apparent to those skilled in the art, from the following detailed description when taken in connection with the accompanying drawing; in which, Figure 1 is a vertical sectional view of the apparatus.

Figure 2 is a horizontal sectional view thereof, taken on line 2—2 of Figure 1; and Figure 3 is a detail perspective view of the centering ring and centering cage, spaced apart to more clearly show the construction.

Referring to the drawing in more detail, numeral 1 indicates the holder for the two-part blow mold 2, and numeral 3 indicates the holder for the two-part neck ring 4. Numeral 5 refers to the mold bottom. The neck ring halves and the blow mold halves are mounted in their respective holders in the usual way, and of course the holders are pivotally mounted as usual, to permit the mold and neck ring halves to be swung apart.

Numeral 6 refers to a centering ring which is fixed to the lower face of the neck ring holder 3. The centering ring is formed of two parts, which are substantially semi-circular in shape. In the specific form shown the semi-circular centering ring sections are cut away at their rear ends so as not to interfere with certain other parts in the opening and closing of the molds in the particular machine employed. But obviously it may be desirable to complete the semi-circular section in some forms. Likewise, the invention is not limited to the sections being of substantially full extent, for it will be apparent that these sections need be of only sufficient extent to cause proper alignment with the blow mold. The centering ring sections may be secured to the neck ring holder by any desired means, but in the specific form illustrated dowel pins 7 and screws 8 are employed for that purpose.

Numeral 9 refers to a centering cage which is mounted on top of the blow mold holder, and which projects upwardly to the plane of the centering ring. The sections of the centering cage are cut away at their rear ends in the specific form shown, but these sections may be complete or only of sufficient length to cause proper alignment between the blow mold and neck ring. The centering cage sections are concentric with the centering ring sections, and the arrangement is such that when the neck ring and blow mold are closed, the centering cage sections will contact with the centering ring sections and thereby cause exact alignment between the neck ring holder and the blow mold holder, and it therefore follows, of course, that there will be exact alignment between the neck ring and the blow mold. The centering cage section may be secured to the blow mold holder by any desired means, as by dowel pins 10 and screws 11.

As mentioned hereinbefore considerable ware is lost by reason of the necks of containers being off center with respect to the bodies thereof, due to the neck ring and blow mold being out of alignment. It will be apparent from the foregoing description that by means of the simple and inexpensive device disclosed herein exact alignment between the neck ring and blow mold is always maintained, thereby avoiding loss of ware.

Having fully described the invention, what I claim is:

1. Mold aligning apparatus including a partible neck ring, a neck ring holder in which the neck ring halves are mounted, a partible blow mold ring halves are mounted, a partible blow mold below the neck ring, a blow mold holder in which the blow mold halves are mounted, a centering ring removably attached to the neck ring holder, and a centering cage removably attached to the blow mold holder and adapted to embrace the centering ring when the neck ring and blow mold are closed.

2. Mold aligning apparatus including a partible neck ring, a neck ring holder in which the neck ring halves are mounted, a partible blow mold below the neck ring, a blow mold holder in which the blow mold halves are mounted, an arcuate shaped member removably attached to each section of the neck ring holder and an arcuate shaped member removably attached to each section of the blow mold holder, the arcuate shaped members of the blow mold holder cooperating with the arcuate shaped members of the neck ring holder to cause the neck ring and blow mold to align when closed.

3. Mold aligning apparatus including a partible neck ring, a neck ring holder in which the neck ring halves are mounted, a partible blow mold below the neck ring, a blow mold holder in which the blow mold halves are mounted, a centering ring comprising two substantially semi-circular sections, said sections removably attached to the neck ring holder, and a centering cage comprising two substantially semi-circular sections, said cage sections mounted on the blow mold holder and cooperating with the centering ring sections to align the neck ring and blow mold.

HOSEA SHAFFER.